United States Patent
Frey

(10) Patent No.: US 9,784,880 B2
(45) Date of Patent: *Oct. 10, 2017

(54) COMPENSATED DEEP PROPAGATION MEASUREMENTS WITH DIFFERENTIAL ROTATION

(71) Applicant: Schlumberger Technology Corporation, Sugar Land, TX (US)

(72) Inventor: Mark Frey, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 233 days.

This patent is subject to a terminal disclaimer.

(21) Appl. No.: 14/549,396

(22) Filed: Nov. 20, 2014

(65) Prior Publication Data

US 2016/0146967 A1    May 26, 2016

(51) Int. Cl.
*G01V 3/26* (2006.01)
*G01V 3/38* (2006.01)
*G01V 3/30* (2006.01)

(52) U.S. Cl.
CPC ..................................... *G01V 3/26* (2013.01)

(58) Field of Classification Search
CPC .......... G01V 3/30; G01V 11/002; G01V 3/28; G01V 3/18; G01V 3/26; G01V 3/104; G01V 3/108; E21B 47/011; E21B 47/122; E21B 47/01
See application file for complete search history.

(56) References Cited

U.S. PATENT DOCUMENTS

| 5,508,616 A | 4/1996 | Sato et al. |
| 5,594,343 A | 1/1997 | Clark et al. |
| 5,757,191 A | 5/1998 | Gianzero |
| 6,819,111 B2 | 11/2004 | Fanini et al. |

(Continued)

FOREIGN PATENT DOCUMENTS

| EP | 0721111 B1 | 8/2002 |
| WO | 2013169638 A1 | 11/2013 |

(Continued)

OTHER PUBLICATIONS

International Search Report issued in related PCT application PCT/US2015/060791 on Jan. 29, 2016, 4 pages.

(Continued)

*Primary Examiner* — Alesa Allgood

(57) ABSTRACT

A method for making downhole electromagnetic logging while drilling measurements includes rotating an electromagnetic logging while drilling tool in a subterranean wellbore. The logging tool includes a first transmitter and a first receiver deployed on a first sub and a second transmitter and a second receiver deployed on a second sub. Rotating the logging tool causes the first and second subs to rotate at different rates. A plurality of electromagnetic voltage measurements are acquired from the first and second receivers while rotating. The acquired voltage measurements are processed to compute harmonic coefficients which are mathematically rotated to obtain rotated coefficients. Ratios of selected ones of the rotated coefficients are processed to compute gain compensated measurement quantities.

7 Claims, 4 Drawing Sheets

(56) References Cited

U.S. PATENT DOCUMENTS

| | | | |
|---|---|---|---|
| 6,911,824 B2 | 6/2005 | Bittar | |
| 6,969,994 B2 | 11/2005 | Minerbo et al. | |
| 7,382,135 B2 * | 6/2008 | Li | G01V 3/30 |
| | | | 324/338 |
| 7,536,261 B2 | 5/2009 | Omeragic et al. | |
| 7,915,895 B2 | 3/2011 | Chemali et al. | |
| 7,990,153 B2 | 8/2011 | Streinz et al. | |
| 7,991,555 B2 | 8/2011 | Yang et al. | |
| 8,159,227 B2 | 4/2012 | Wang | |
| 8,195,400 B2 | 6/2012 | Wang | |
| 8,274,289 B2 | 9/2012 | Bittar et al. | |
| 8,466,683 B2 | 6/2013 | Legendre et al. | |
| 8,536,871 B2 | 9/2013 | Li et al. | |
| 8,558,548 B2 * | 10/2013 | Minerbo | G01V 3/28 |
| | | | 324/338 |
| 8,626,446 B2 | 1/2014 | Dong et al. | |
| 2002/0120401 A1 | 8/2002 | MacDonald et al. | |
| 2004/0256152 A1 | 12/2004 | Dashevskiy et al. | |
| 2005/0083063 A1 | 4/2005 | Omeragic et al. | |
| 2005/0284659 A1 | 12/2005 | Hall et al. | |
| 2007/0024286 A1 | 2/2007 | Wang | |
| 2008/0078550 A1 | 4/2008 | Chatterji et al. | |
| 2009/0277630 A1 * | 11/2009 | McDaniel | E21B 43/26 |
| | | | 166/250.1 |
| 2010/0078216 A1 | 4/2010 | Radford et al. | |
| 2011/0074427 A1 | 3/2011 | Wang et al. | |
| 2011/0238312 A1 | 9/2011 | Seydoux et al. | |
| 2011/0291855 A1 | 12/2011 | Homan et al. | |
| 2012/0025834 A1 * | 2/2012 | Minerbo | G01V 3/28 |
| | | | 324/339 |
| 2012/0037360 A1 | 2/2012 | Arizmendi, Jr. et al. | |
| 2012/0105076 A1 | 5/2012 | Li et al. | |
| 2012/0242342 A1 | 9/2012 | Rabinovich et al. | |
| 2012/0286790 A1 | 11/2012 | Yang et al. | |
| 2013/0035862 A1 | 2/2013 | Fang et al. | |
| 2013/0191028 A1 | 7/2013 | Homan et al. | |
| 2013/0301388 A1 | 11/2013 | Hartmann et al. | |
| 2013/0304384 A1 | 11/2013 | Rabinovich et al. | |
| 2015/0276967 A1 | 10/2015 | Frey | |
| 2015/0276968 A1 * | 10/2015 | Frey | G01V 3/30 |
| | | | 324/339 |
| 2015/0276971 A1 | 10/2015 | Frey | |
| 2015/0276972 A1 | 10/2015 | Frey | |
| 2015/0276973 A1 | 10/2015 | Frey | |

FOREIGN PATENT DOCUMENTS

| | | |
|---|---|---|
| WO | 2014003701 | 1/2014 |
| WO | 2014003702 | 1/2014 |
| WO | 2015153279 A1 | 10/2015 |
| WO | 2015153280 A1 | 10/2015 |
| WO | 2015153282 A1 | 10/2015 |
| WO | 2015153289 A1 | 10/2015 |
| WO | 2015153294 A1 | 10/2015 |
| WO | 2015153303 A1 | 10/2015 |

OTHER PUBLICATIONS

Zhong, "DDRB Measurement Construction", Retrieved from the Internet: URL: http://omniworks.slb.com/support/OmniWorks/ARL/Fetch/File?objName=em_ans\DDR_EMLA\FwdModeling\Core\DDRB_measurement_construction.docx.

* cited by examiner

COMPENSATED DEEP PROPAGATION MEASUREMENTS WITH DIFFERENTIAL ROTATION

CROSS REFERENCE TO RELATED APPLICATIONS

None.

FIELD OF THE DISCLOSURE

Disclosed embodiments relate generally to downhole electromagnetic logging and more particularly to a method for making fully gain compensated deep propagation measurements, such as phase shift and attenuation measurements, while upper and lower antenna subs rotate at different rates.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed e.g., in pay-zone steering applications, to provide information upon which steering decisions may be made.

Downhole electromagnetic measurements are commonly inverted at the surface using a formation model to obtain various formation parameters, for example, including vertical resistivity, horizontal resistivity, distance to a remote bed, resistivity of the remote bed, dip angle, and the like. One challenge in utilizing directional electromagnetic resistivity measurements, is obtaining a sufficient quantity of data to perform a reliable inversion. The actual formation structure is frequently significantly more complex than the formation models used in the inversion. The use of a three-dimensional matrix of propagation measurements may enable a full three-dimensional measurement of the formation properties to be obtained as well as improve formation imaging and electromagnetic look ahead measurements. However, there are no known methods for providing a fully gain compensated tri-axial propagation measurement, especially in a BHA configuration in which upper and lower antenna subs rotate at different rates (e.g., as used in power drilling).

SUMMARY

A disclosed bottom hole assembly includes a downhole drilling motor deployed axially between first and second electromagnetic logging while drilling subs. The motor is configured to rotate the first sub with respect to the second sub. The first sub includes a first transmitter and a first receiver axially spaced apart from one another and the second sub includes a second transmitter and a second receiver axially spaced apart from one another. Each of the first and second transmitters and first and second receivers includes an axial antenna and collocated first and second transverse antennas. The first and second transverse antennas in the first receiver are rotationally offset by a predefined angle from the first and second transverse antennas in the first transmitter and the first and second transverse antennas in the second receiver are rotationally offset by the predefined angle from the first and second transverse antennas in the second transmitter.

A method for making downhole electromagnetic logging while drilling measurements is disclosed. The method includes rotating an electromagnetic logging while drilling tool in a subterranean wellbore. The logging tool includes a first transmitter and a first receiver deployed on a first sub and a second transmitter and a second receiver deployed on a second sub. A bottom hole assembly is configured such that the first sub rotates at a greater rotation rate than that of the second sub. Each of the first and second transmitters and first and second receivers includes an axial antenna and collocated first and second transverse antennas. The first and second transverse antennas in the first receiver are rotationally offset by a predefined angle from the first and second transverse antennas in the first transmitter. The method further includes acquiring a plurality of electromagnetic voltage measurements from the first and second receivers while rotating. The acquired voltage measurements are processed to compute harmonic coefficients which are mathematically rotated through at least the predefined angle to obtain rotated coefficients. Ratios of selected ones of the rotated coefficients are processed to compute gain compensated measurement quantities.

The disclosed embodiments may provide various technical advantages. For example, the disclosed methodology provides a method for obtaining a gain compensated three-dimensional matrix of deep electromagnetic measurements using orthogonal antennas in which a lower sensor sub rotates a different rate than an upper sensor sub. The acquired measurements are fully gain compensated and independent of antenna tilt angle variation. Moreover, the disclosed method and apparatus tends to be insensitive to bending and alignment angle errors.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
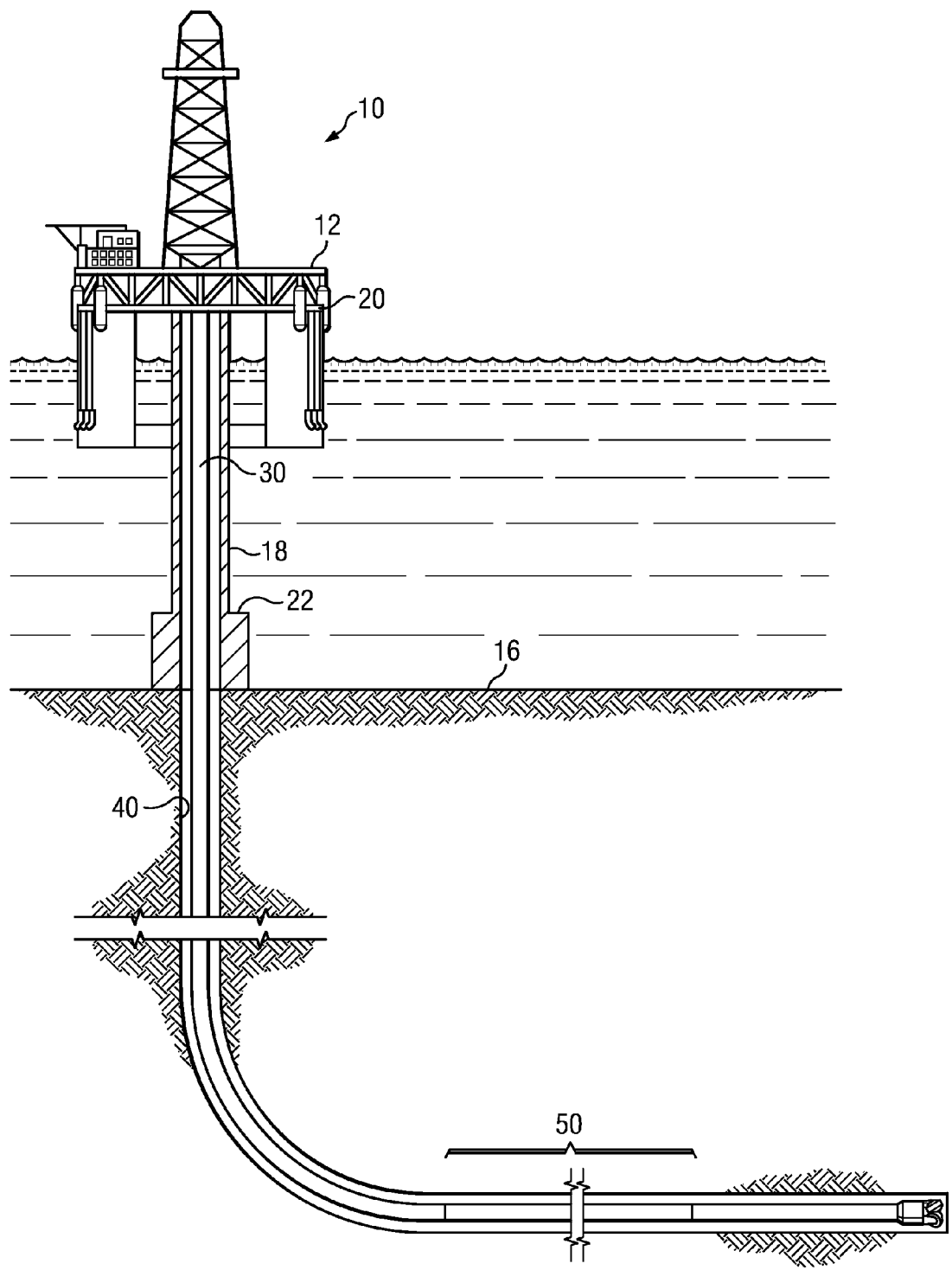
FIG. 1 depicts one example of a drilling rig on which the disclosed electromagnetic logging tools and methods may be utilized.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes a deep reading electromagnetic measurement tool 50 configured to make tri-axial electromagnetic logging measurements. As described in more detail below the deep reading electromagnetic measurement tool 50 may include multiple orthogonal antennas deployed on at least first and second axially spaced subs.

It will be understood that the deployment illustrated on FIG. 1 is merely an example. Drill string 30 may include substantially any suitable downhole tool components, for example, including a steering tool such as a rotary steerable tool, a downhole telemetry system, and one or more MWD or LWD tools including various sensors for sensing downhole characteristics of the borehole and the surrounding formation. The disclosed embodiments are by no means limited to any particular drill string configuration.

It will be further understood that the disclosed embodiments are not limited to use with a semisubmersible platform 12 as illustrated on FIG. 1. The disclosed embodiments are equally well suited for use with either onshore or offshore subterranean operations.

Figure 2A:
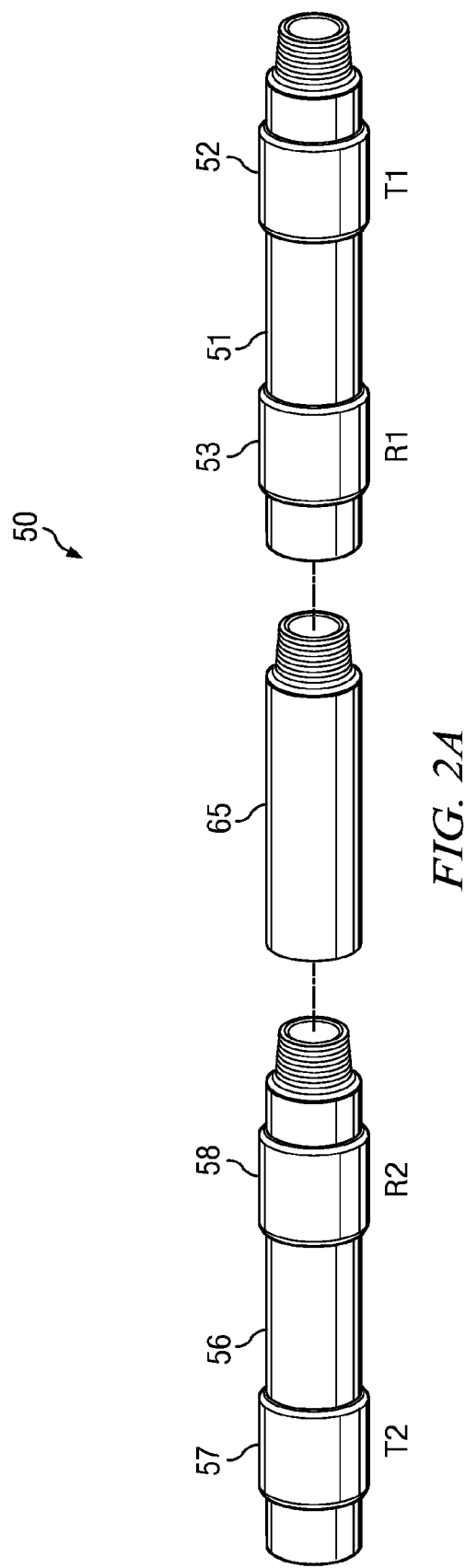
FIG. 2A depicts one example of the deep reading electromagnetic logging tool shown on FIG. 1.
Figure 2B:
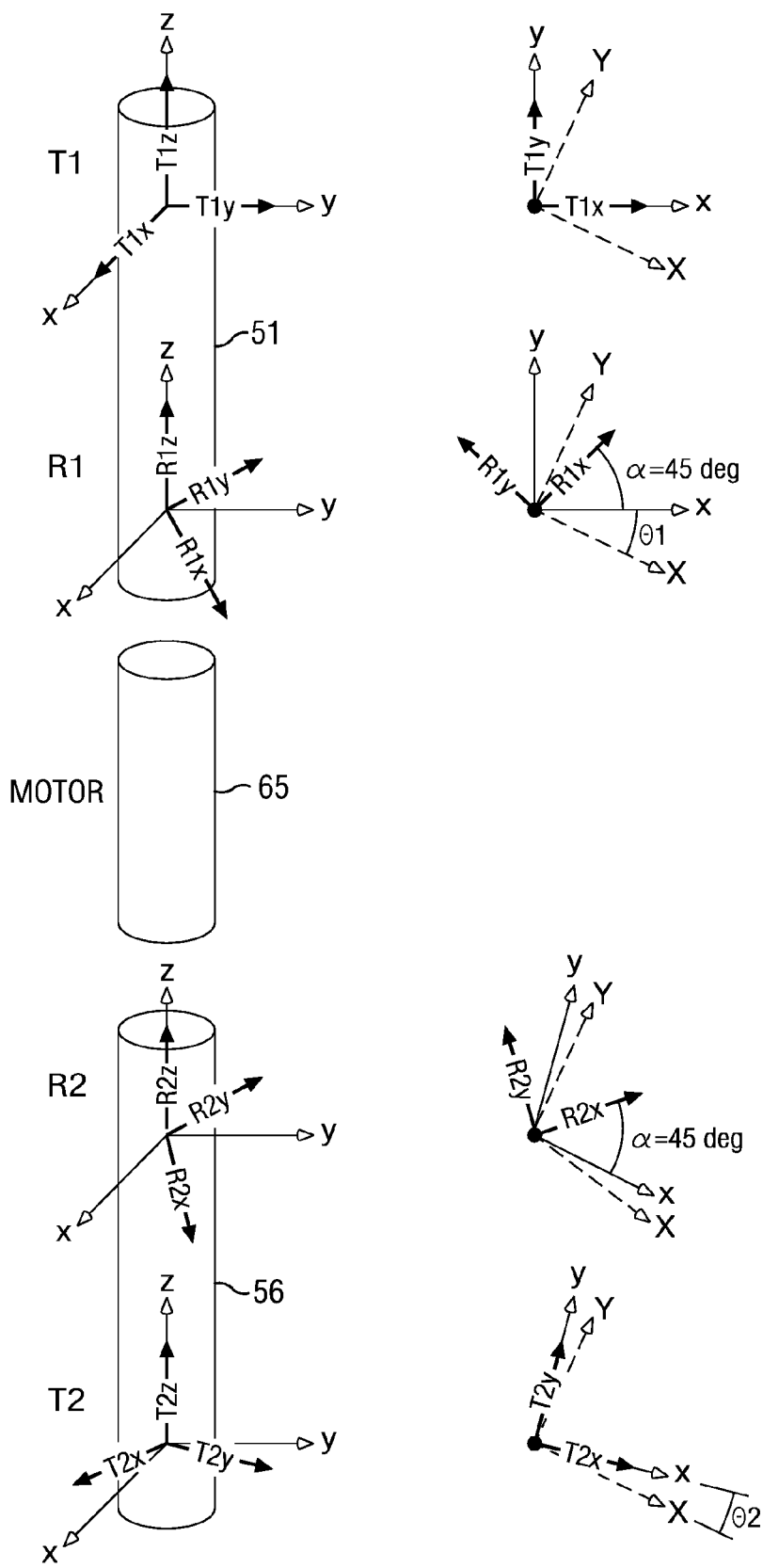
FIG. 2B schematically depicts a deep reading electromagnetic logging tool including collocated triaxial transmitters and receivers.

FIGS. 2A and 2B (collectively FIG. 2) depict electromagnetic measurement tool embodiment 50. In the embodiment depicted on FIG. 2A measurement tool 50 includes a first transmitter 52 and a first receiver 53 deployed on a first sub 51 and a second transmitter 57 and a second receiver 58 deployed on a second sub 56. The first and second subs 51 and 56 may be axially spaced apart substantially any suitable distance to achieve a desired measurement depth.

FIG. 2A further depicts a drilling motor 65 deployed between the first and second subs 51 and 56. The drilling motor may include, for example, a progressing cavity hydraulic motor (also referred to in the art as a Moineau style power section). Such motors are common in drilling operations (e.g., slide drilling and power drilling operations) and make use of hydraulic power from drilling fluid to provide torque and rotary power, for example, to a drill bit assembly located below the motor (and below sub 51). In the depicted embodiment, the drilling motor 65 causes the first sub 51 to rotate with respect to the second sub 56. In power drilling operations, the first and second subs 51 and 56 rotate at corresponding first and second rotation rates with respect to the wellbore (e.g., the second sub 56 rotates at the same rotation rate as the drill string 30 while the first sub 51 rotates with the bit 32 at rate equal to the rotation rate of the drill string plus a differential rotation rate provided by the motor 65). While not shown, it will be understood that other BHA tools may be deployed between subs 51 and 56.

As described in more detail below each of the transmitters 52 and 57 and receivers 53 and 58 may include a tri-axial antenna set (e.g., including an axial antenna and first and second transverse antennas that are orthogonal to one another in this particular embodiment). As is known to those of ordinary skill in the art, an axial antenna is one whose moment is substantially parallel with the longitudinal axis of the tool. Axial antennas are commonly wound about the circumference of the logging tool such that the plane of the antenna is substantially orthogonal to the tool axis. A transverse antenna is one whose moment is substantially perpendicular to the longitudinal axis of the tool. A transverse antenna may include, for example, a saddle coil (e.g., as disclosed in U.S. Patent Publications 2011/0074427 and 2011/0238312 each of which is incorporated by reference herein).

FIG. 2B depicts the antenna moments for transmitters 52 and 57 and receivers 53 and 58 on electromagnetic measurement tool 50. In the depicted embodiment, transmitter 52 (T1) includes three collocated tri-axial antennas having mutually orthogonal moments T1$x$, T1$y$, and T1$z$ aligned with the x-, y-, and z-directions. Receiver 53 (R1) may also include three collocated tri-axial antennas having mutually orthogonal moments R1$x$, R1$y$, and R1$z$. Moment R1$z$ is aligned with T1$z$ (and the z-azis) while moments R1$x$ and R1$y$ are rotationally offset from T1$x$ and T1$y$ by an offset angle $\alpha$ (e.g., 45 degrees).

Transmitter 57 (T2) on sub 56 may also include collocated tri-axial antennas having three mutually orthogonal moments T2$x$, T2$y$, and T2$z$. Receiver 58 (R2) may also include collocated tri-axial antennas having mutually orthogonal moments R2$x$, R2$y$, and R2$z$. The moment R2$z$ is aligned with T2$z$ while moments R2$x$ and R2$y$ are rotationally offset from T2$x$ and T2$y$ by $\alpha$ (e.g., 45 degrees). Moreover, as described above, the first and second subs 51 and 56 rotate with respect to one another such that the moments of the x- and y-axis transmitting and receiving antennas are misaligned and rotate with respect to one another (i.e., the misalignment angle between the subs varies with time). Using the notation shown on FIG. 2B, at any instant in time, the orientation angle of the x-axis on sub 51 (and therefore T1$x$) is $\theta_1$ with respect to an arbitrary 'global' (or wellbore) x-direction. Likewise, at the same instant in time, the orientation angle of the x-axis on sub 56 (and therefore T2$x$) is $\theta_2$ with respect to the global x-direction. It will thus be understood that the moments of the x- and y-axis transmitting and receiving antennas are misaligned in subs 51 and 56 by a misalignment angle $\gamma = \theta_1 - \theta_2$ such that when $\theta_1 = \theta_2$ T1$x$ and T2$x$ are aligned and R1$x$ and R2$x$ are aligned (and when $\theta_1 = \theta_2 = 0$ T1$x$ and T2$x$ are aligned with the global x direction). It will be understood that $\theta_1$ and $\theta_2$ may be referred to as toolface angles of the first and second subs in that they define the rotational orientation of the subs with respect to a global reference direction.

It will be further understood that the offset angle $\alpha$ is not necessarily 45 degrees as depicted on FIG. 2B, but may be substantially any non-zero, non-ninety degree angle. An offset angle $\alpha$ in a range from about 30 to about 60 degrees is generally preferred, although by no means required. It will also be understood that $\theta_1$ and $\theta_2$ are variable with time due to the rotation of the subs 51 and 56 with respect to the wellbore. Since the first and second subs rotate at different rates the misalignment angle also varies with time as described above.

While FIG. 2B depicts collocated transmitter (T1 and T2) and collocated receiver (R1 and R2) embodiments, it will be understood that the disclosed embodiments are not so limited. For example, in alternative configurations one or more of the z-axis transmitting antennas T1$z$, T2$z$ and/or the z-axis receiving antennas R1$z$, R2$z$ may not be collocated with the corresponding x- and y-axis transmitter and receiver antennas, but may be axially offset therefrom. In general, the x- and y-axis transmitter and receiver antennas are collocated with one another while collocation of any one or more of the corresponding z-axis antennas is optional.

Figures 3A, 3B:
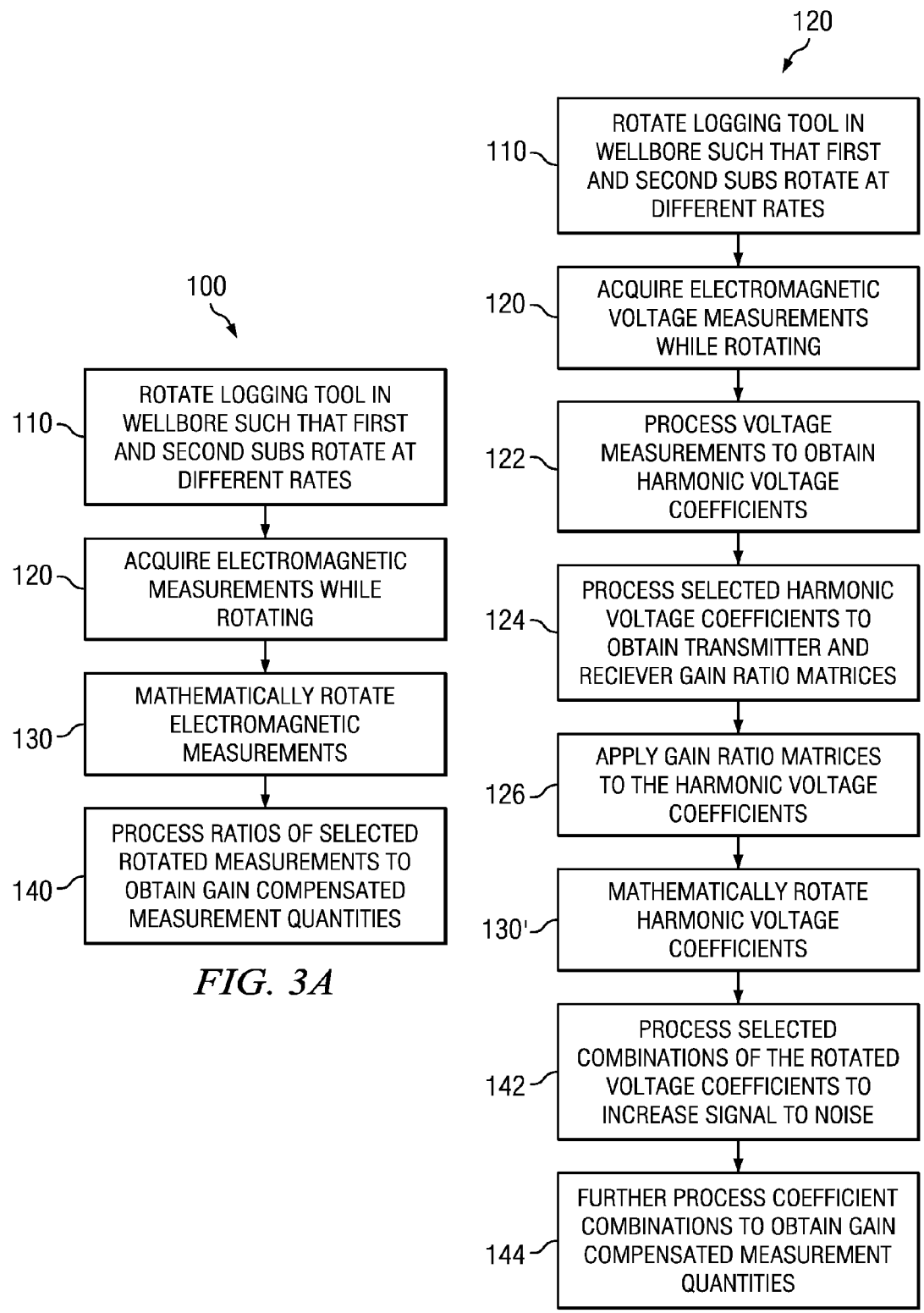
FIG. 3A depicts a flow chart of a disclosed method embodiment.
FIG. 3B depicts a flow chart of another disclosed method embodiment.

FIG. 3A depicts a flow chart of one disclosed method embodiment 100. An electromagnetic measurement tool (e.g., measurement tool 50 on FIG. 2) is rotated in a subterranean wellbore at 110 such that the first and second subs rotate at different rates (e.g., such that the first sub rotates at a higher rate than the second sub). Electromagnetic measurements are acquired at 120 while the tool is rotating and processed to obtain harmonic voltage coefficients. Selected ones of the harmonic voltage coefficients are rotated mathematically at 130 to simulate rotation of the x and y antennas in the R1 and R2 receivers such that they are rotationally aligned with the x and y antennas in the T1 and T2 transmitters. Such rotation removes the effect of the offset angle $\alpha$. The mathematical rotation of the harmonic voltage coefficients may further include rotation by $\theta_1$, $\theta_2$, or $\theta_2-\theta_1$ such that the R1 and R2 receiver measurements are rotationally aligned with one another (and/or with a global reference direction). Ratios of selected ones of the rotated voltage coefficients may then be processed to obtain gain compensated measurement quantities at 140.

FIG. 3B depicts a flow chart of an optional, more detailed embodiment 100' of the method 100 depicted on FIG. 3A. An electromagnetic measurement tool is rotated in a subterranean wellbore at 110. As described above a three dimensional matrix of electromagnetic voltage measurements is acquired at 120 while rotating. The acquired measurements are processed at 122 to obtain harmonic voltage coefficients (e.g., the DC, first harmonic cosine, first harmonic sine, second harmonic cosine, and second harmonic sine coefficients or the DC, first and second harmonic cosine, first and second harmonic sine, cosine cosine, cosine sine, sine cosine, and sine sine coefficients of the couplings). At 124, selected ones of the harmonic voltage coefficients are processed to obtain transmitter and receiver gain ratio matrices. The harmonic voltage coefficients may be selected, for example, so that the gain ratio matrices replace the y transmitter and y receiver gains with x transmitter and x receiver gains when applied to the harmonic voltage coefficients. These gain ratio matrices may then be applied to the harmonic voltage coefficients at 126. The harmonic voltage coefficients (with the applied gain ratio matrices) are rotated mathematically at 130' as described above with respect to element 130 on FIG. 3A. At 142, selected combinations of the rotated measurements obtained in 130' may be processed to obtain coefficient combinations and thereby increase the signal to noise ratio of the measurements. Selected ratios of these coefficient combinations may then be further processed at 144 to obtain gain compensated measurement quantities.

As is known to those of ordinary skill in the art, a time varying electric current (an alternating current) in a transmitting antenna produces a corresponding time varying magnetic field in the local environment (e.g., the tool collar and the formation). The magnetic field in turn induces electrical currents (eddy currents) in the conductive formation. These eddy currents further produce secondary magnetic fields which may produce a voltage response in a receiving antenna. The measured voltage in the receiving antennas can be processed, as is known to those of ordinary skill in the art, to obtain one or more properties of the formation.

In general the earth is anisotropic such that its electrical properties may be expressed as a three-dimensional tensor which contains information on formation resistivity anisotropy, dip, bed boundaries and other aspects of formation geometry. It will be understood by those of ordinary skill in the art that the mutual couplings between the tri-axial transmitter antennas and the tri-axial receiver antennas depicted on FIGS. 2B and 2C form a three-dimensional matrix and thus may have sensitivity to a full three-dimensional formation impedance tensor. For example, a three-dimensional matrix of measured voltages V may be expressed as follows:

$$V_{ij} = \begin{bmatrix} V_{ijxx} & V_{ijxy} & V_{ijxz} \\ V_{ijyx} & V_{ijyy} & V_{ijyz} \\ V_{ijzx} & V_{ijzy} & V_{ijzz} \end{bmatrix} = I_i Z_{ij} = \begin{bmatrix} I_{ix} & 0 & 0 \\ 0 & I_{iy} & 0 \\ 0 & 0 & I_{iz} \end{bmatrix} \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (1)$$

where $V_{ij}$ represent the three-dimensional matrix of measured voltages, with i indicating the corresponding transmitter triad (e.g., T1 or T2) and j indicating the corresponding receiver triad (e.g., R1 or R2), $I_i$ represent the transmitter currents, and $Z_{ij}$ represent the transfer impedances which depend on the electrical and magnetic properties of the environment surrounding the antenna pair in addition to the frequency, geometry, and spacing of the antennas. The third and fourth subscripts indicate the axial orientation of the transmitter and receiver antennas. For example, $V_{12xy}$ represents a voltage measurement on the y-axis antenna of receiver R2 from a firing of the x-axis antenna of transmitter T1.

When bending of the measurement tool is negligible (e.g., less than about 10 degrees), the measured voltages may be modeled mathematically, for example, as follows:

$$V_{ij} = G_{Ti} m_{Ti} R_{\theta_t}{}^t Z_{ij} R_{\theta_r} m_{Rj} G_{Rj} \quad (2)$$

where $Z_{ij}$ are matrices representing the triaxial tensor couplings (impedances) between the locations of transmitter i and receiver j, $G_{Ti}$ and $G_{Rj}$ are diagonal matrices representing the transmitter and receiver gains, $R_{\theta_t}$ and $R_{\theta_r}$ represent the rotation matrices for rotating the transmitter and receiver about the z-axis through angles $\theta_t$ and $\theta_r$, $m_{Ti}$ and $m_{Rj}$ represent the matrices of the direction cosines for the transmitter and receiver moments at $\theta=0$, and the superscript t represents the transpose of the corresponding matrix. The matrices in Equation 2 may be given, for example, as follows:

$$Z_{ij} = \begin{bmatrix} Z_{ijxx} & Z_{ijxy} & Z_{ijxz} \\ Z_{ijyx} & Z_{ijyy} & Z_{ijyz} \\ Z_{ijzx} & Z_{ijzy} & Z_{ijzz} \end{bmatrix} \quad (3)$$

$$G_{Ti} = \begin{bmatrix} g_{Tix} & 0 & 0 \\ 0 & g_{Tiy} & 0 \\ 0 & 0 & g_{Tiz} \end{bmatrix} \quad (4)$$

$$G_{Rj} = \begin{bmatrix} g_{Rjx} & 0 & 0 \\ 0 & g_{Rjy} & 0 \\ 0 & 0 & g_{Rjz} \end{bmatrix} \quad (5)$$

$$R_{\theta_t} = \begin{bmatrix} \cos(\theta_t) & -\sin(\theta_t) & 0 \\ \sin(\theta_t) & \cos(\theta_t) & 0 \\ 0 & 0 & 1 \end{bmatrix} \quad (6)$$

$$R_{\theta_r} = \begin{bmatrix} \cos(\theta_r) & -\sin(\theta_r) & 0 \\ \sin(\theta_r) & \cos(\theta_r) & 0 \\ 0 & 0 & 1 \end{bmatrix} \quad (7)$$

Using the T1x antenna direction as a reference direction for the first sub and the T2x antenna direction as a reference direction for the second sub, the matrices of the direction cosines of the transmitter and receiver moments may be given, for example, as follows:

$$m_{T1}=I$$

$$m_{R1}=R_\alpha$$

$$m_{R2}=R_\alpha$$

$$m_{T2}=I \quad (8)$$

where I represents the identity matrix and $R_\alpha$ represents the rotation matrix about the z-axis through the angle $\alpha$.

Substituting Equation 8 into Equation 2 yields the following mathematical expressions:

$$V_{11}=G_{T1}(R_{\theta1}{}^t Z_{11} R_{\theta1})R_\alpha G_{R1}$$

$$V_{12}=G_{T1}(R_{\theta1}{}^t Z_{12} R_{\theta2})R_\alpha G_{R2}$$

$$V_{21}=G_{T2}(R_{\theta2}{}^t Z_{21} R_{\theta1})R_\alpha G_{R1}$$

$$V_{22}=G_{T2}(R_{\theta2}{}^t Z_{22} R_{\theta2})R_\alpha G_{R2} \quad (9)$$

The rotated tensor couplings for the single sub measurements (i.e., shown in the parentheses in Equation 9 for $V_{11}$ and $V_{22}$) may be expressed mathematically in harmonic form, for example, as follows:

$$R_{\theta i}{}^t Z_{ii} R_{\theta i} = Z_{DC\_ii} + Z_{FHC\_ii}\cos(\theta_i) + Z_{FHS\_ii}\sin(\theta_i) + Z_{SHC\_ii}\cos(2\theta_i) + Z_{SHS\_ii}\sin(2\theta_i) \quad (10)$$

where $Z_{DC\_ii}$ represents a DC (average) coupling coefficient, $Z_{FHC\_ii}$ and $Z_{FHS\_ii}$ represent first order harmonic cosine and first order harmonic sine coefficients (referred to herein as first harmonic cosine and first harmonic sine coefficients), and $Z_{SHC\_ii}$ and $Z_{SHS\_ii}$ represent second order harmonic cosine and second order harmonic sine coefficients (referred to herein as second harmonic cosine and second harmonic sine coefficients) of the couplings. These coefficients are shown below:

$$Z_{DC\_ii} = \begin{bmatrix} \frac{Z_{iixx}+Z_{iiyy}}{2} & \frac{(Z_{iixy}-Z_{iiyx})}{2} & 0 \\ \frac{-(Z_{iixy}-Z_{iiyx})}{2} & \frac{Z_{iixx}+Z_{iiyy}}{2} & 0 \\ 0 & 0 & Z_{iizz} \end{bmatrix} \quad (11)$$

$$Z_{FHC\_ii} = \begin{bmatrix} 0 & 0 & Z_{iixz} \\ 0 & 0 & Z_{iiyz} \\ Z_{iizx} & Z_{iizy} & 0 \end{bmatrix}$$

$$Z_{FHS\_ii} = \begin{bmatrix} 0 & 0 & Z_{iiyz} \\ 0 & 0 & -Z_{iixz} \\ Z_{iizy} & -Z_{iizx} & 0 \end{bmatrix}$$

$$Z_{SHC\_ii} = \begin{bmatrix} \frac{Z_{iixx}-Z_{iiyy}}{2} & \frac{(Z_{iixy}+Z_{iiyx})}{2} & 0 \\ \frac{(Z_{iixy}+Z_{iiyx})}{2} & -\frac{(Z_{iixx}-Z_{iiyy})}{2} & 0 \\ 0 & 0 & 0 \end{bmatrix}$$

$$Z_{SHS\_ii} = \begin{bmatrix} \frac{(Z_{iixy}+Z_{iiyx})}{2} & -\frac{(Z_{iixx}-Z_{iiyy})}{2} & 0 \\ -\frac{(Z_{iixx}-Z_{iiyy})}{2} & -\frac{(Z_{iixy}+Z_{iiyx})}{2} & 0 \\ 0 & 0 & 0 \end{bmatrix}$$

As stated above, the receiver antenna voltages are measured at 120 while the tool rotates at 100 (FIGS. 3A and 3B). Following the form of Equation 10, the measured voltages $V_{11}$ and $V_{22}$ may be fit to a harmonic function of the rotation angle $\theta_i$ to obtain the harmonic voltage coefficients, for example, as follows (e.g., at 122 in FIG. 3B):

$$V_{ii}=V_{DC\_ii}+V_{FHC\_ii}\cos(\theta_i)+V_{FHS\_ii}\sin(\theta_i)+V_{SHC\_ii}\cos(2\theta_i)+V_{SHS\_ii}\sin(2\theta_i) \quad (12)$$

Following Equation 2, the DC, first harmonic, and second harmonic voltage coefficients may be modeled, for example, as follows:

$$V_{DC\_ii}=G_{Ti}m_{Ti}{}^t Z_{DC\_ii} m_{Ri} G_{Ri}$$

$$V_{FHC\_ii}=G_{Ti}m_{Ti}{}^t Z_{FHC\_ii} m_{Ri} G_{Ri}$$

$$V_{FHS\_ii}=G_{Ti}m_{Ti}{}^t Z_{FHS\_ii} m_{Ri} G_{Ri}$$

$$V_{SHC\_ii}=G_{Ti}m_{Ti}{}^t Z_{SHC\_ii} m_{Ri} G_{Ri}$$

$$V_{SHS\_ii}=G_{Ti}m_{Ti}{}^t Z_{SHS\_ii} m_{Ri} G_{Ri} \quad (13)$$

In one disclosed embodiment gain compensation may be accomplished by obtaining ratios between the x and y and receiver gains and the x and y transmitter gains (e.g., at 124 in FIG. 3B). The DC voltage measurements at receiver R1 upon firing transmitter T1 may be expressed as, for example, follows:

$$V_{DC\_11} = \begin{bmatrix} V_{DC\_11xx} & V_{DC\_11xy} & V_{DC\_11xz} \\ V_{DC\_11yx} & V_{DC\_11yy} & V_{DC\_11yz} \\ V_{DC\_11zx} & V_{DC\_11zy} & V_{DC\_11zz} \end{bmatrix} \quad (14)$$

From Equations 11 and 13, the measured DC voltages $V_{DC\_11}$ may be expressed as a function of the couplings (impedances), gains, and the angle $\alpha$, for example, as follows:

$$\begin{bmatrix} g_{T1x}g_{R1x}\left[\frac{(z_{11xx}+z_{11yy})}{2}\cos(\alpha)+\frac{(z_{11xy}-z_{11yx})}{2}\sin(\alpha)\right] & g_{T1x}g_{R1y}\left[\frac{(z_{11xy}-z_{11yx})}{2}\cos(\alpha)-\frac{(z_{11xx}+z_{11yy})}{2}\sin(\alpha)\right] & 0 \\ -g_{T1y}g_{R1x}\left[\frac{(z_{11xy}-z_{11yx})}{2}\sin(\alpha)-\frac{(z_{11xx}+z_{11yy})}{2}\cos(\alpha)\right] & g_{T1y}g_{R1y}\left[\frac{(z_{11xx}+z_{11yy})}{2}\cos(\alpha)+\frac{(z_{11xy}-z_{11yx})}{2}\sin(\alpha)\right] & 0 \\ 0 & 0 & g_{T1z}g_{T1z}Z_{11zz} \end{bmatrix} \quad (15)$$

Taking the ratio between the DC xx and yy voltage measurements yields:

$$\frac{V_{DC\_11xx}}{V_{DC\_11yy}} = \frac{g_{R1x}}{g_{R1y}} \frac{g_{T1x}}{g_{T1y}} \quad (16)$$

Likewise, taking the ratio between the DC voltage xy and yx measurements yields:

$$\frac{V_{DC\_11xy}}{V_{DC\_11yx}} = -\frac{g_{R1y}}{g_{R1x}} \frac{g_{T1x}}{g_{T1y}} \quad (17)$$

where $g_{R1x}$ and $g_{R1y}$ represent the gains of the x and y antenna on receiver R1 and $g_{T1x}$ and $g_{T1y}$ represent the gains of the x and y antenna on transmitter T1. Equations 16 and 17 may be combined to obtain measured quantities that are equivalent to a gain ratio of the x and y receiver and a gain ratio of the x and y transmitter, for example, as follows:

$$gR1 \overset{def}{=} \sqrt{-\frac{V_{DC_{11xx}} V_{DC_{11yx}}}{V_{DC_{11yy}} V_{DC_{11xy}}}} = \frac{g_{R1x}}{g_{R1y}} \quad (18)$$

$$gT1 \overset{def}{=} \sqrt{-\frac{V_{DC\_11xx} V_{DC\_11xy}}{V_{DC\_11yy} V_{DC\_11yx}}} = \frac{g_{T1x}}{g_{T1y}}$$

Since the gain ratio formulas in Equation 17 involve taking a square root, there may be a 180 degree phase ambiguity (i.e., a sign ambiguity). As such, the gain ratios may not be arbitrary, but should be controlled such that they are less than 180 degrees. For un-tuned receiving antennas, the electronic and antenna gain/phase mismatch (assuming the antenna wires are not flipped from one receiver to another) may generally be controlled to within about 30 degrees (particularly at the lower frequencies used for deep measurements). This is well within 180 degrees (even at elevated temperatures where the mismatch may be at its greatest). For tuned transmitting antennas, however, the phase may change signs (i.e., jump by 180 degrees) if the drift in the antenna tuning moves across the tuning resonance. Such transmitter phase ratio ambiguity (sign ambiguity) may be resolved, for example, using Equations 15 and 16 and the knowledge that the receiver gain/phase ratio is not arbitrary, but limited to about 30 degrees (i.e. to enable the determination of whether the transmitter phase difference is closer to 0 or 180 degrees).

The x and y gain ratios defined in Equation 18 enable the following gain ratio matrices to be defined (e.g., at 124 in FIG. 3B):

$$G_{R1\_ratio} \overset{def}{=} \begin{bmatrix} 1 & 0 & 0 \\ 0 & gR1 & 0 \\ 0 & 0 & 1 \end{bmatrix} = \begin{bmatrix} 1 & 0 & 0 \\ 0 & \frac{g_{R1x}}{g_{R1y}} & 0 \\ 0 & 0 & 1 \end{bmatrix} \quad (19)$$

$$G_{T1\_ratio} \overset{def}{=} \begin{bmatrix} 1 & 0 & 0 \\ 0 & gT1 & 0 \\ 0 & 0 & 1 \end{bmatrix} = \begin{bmatrix} 1 & 0 & 0 \\ 0 & \frac{g_{T1x}}{g_{T1y}} & 0 \\ 0 & 0 & 1 \end{bmatrix}$$

where $G_{R1\_ratio}$ represents the gain ratio matrix for receiver R1 and $G_{T1\_ratio}$ represents the gain ratio matrix for transmitter T1. Similar gain ratio matrices may be obtained for receiver R2 and transmitter T2 such that:

$$G_{R2\_ratio} \overset{def}{=} \begin{bmatrix} 1 & 0 & 0 \\ 0 & gR2 & 0 \\ 0 & 0 & 1 \end{bmatrix} = \begin{bmatrix} 1 & 0 & 0 \\ 0 & \frac{g_{R2x}}{g_{R2y}} & 0 \\ 0 & 0 & 1 \end{bmatrix} \quad (20)$$

$$G_{T2\_ratio} \overset{def}{=} \begin{bmatrix} 1 & 0 & 0 \\ 0 & gT2 & 0 \\ 0 & 0 & 1 \end{bmatrix} = \begin{bmatrix} 1 & 0 & 0 \\ 0 & \frac{g_{T2x}}{g_{T2y}} & 0 \\ 0 & 0 & 1 \end{bmatrix}$$

Applying these gain ratios to the measured voltages (shown in Equation 13) enables the y transmitter and y receiver gains to be replaced by x transmitter and x receiver gains (e.g., at 126 in FIG. 3B). The voltage measurements may then be rotated mathematically (e.g., at 130' in FIG. 3B) to simulate rotation of the x and y antennas in the R1 and R2 receivers with respect to the T1 and T2 transmitters such that they are rotationally aligned with the x and y antennas thereof. Such rotation removes the effect of the offset angle α on the measurements. For example, the DC voltages measured between T1 and R1 may be back rotated by the measured alignment angle between T1 and R1 αm. The alignment angle may be measured using substantially any technique, for example, including a physical caliper measurement, and is referred to as αm to indicate that it is a measured value. This process may be represented mathematically, for example, as follows (for the $V_{11}$ and $V_{22}$ voltage measurements):

$$V_{DC\_ii\_rot} \overset{def}{=} G_{Ti\_ratio} V_{DC\_ii} G_{Ri\_ratio} R^t_{\alpha m} = \quad (21)$$

$$\begin{bmatrix} g_{Tix}g_{Rix}\frac{(z_{iixx}+z_{iiyy})}{2} & g_{Tix}g_{Rix}\frac{(z_{iixy}-z_{iiyx})}{2} & 0 \\ -g_{Tix}g_{Rix}\frac{(z_{iixy}+z_{iiyx})}{2} & g_{Tix}g_{Rix}\frac{(z_{iixx}+z_{iiyy})}{2} & 0 \\ 0 & 0 & g_{Tiz}g_{Riz}z_{iizz} \end{bmatrix}$$

where $V_{DC\_ii\_rot}$ represent the rotated DC voltage coefficients. It will be understood that rotation about the z-axis does not change the value of the DC coefficient (see Equation 10) and that Equation 21 may be expressed identically as:

$$V_{DC\_ii\_rot} \overset{def}{=} G_{Ti\_ratio} V_{DC\_ii} G_{Ri\_ratio}.$$

Notwithstanding, in the description that follows, the DC coefficients are shown to be rotated to be consistent with the first harmonic and second harmonic coefficients.

The first harmonic cosine coefficients may be similarly rotated to obtain rotated first harmonic cosine coefficients, for example, as follows:

$$V_{FHC\_ii\_rot} \overset{def}{=} G_{Ti\_ratio} V_{FHC\_ii} G_{Ri\_ratio} R^t_{\alpha m} = \quad (22)$$

$$\begin{bmatrix} 0 & 0 & g_{Tix}g_{Riz}z_{iixz} \\ 0 & 0 & g_{Tix}g_{Riz}z_{iiyz} \\ g_{Tiz}g_{Rix}z_{iizx} & g_{Tiz}g_{Rix}z_{iizy} & 0 \end{bmatrix}$$

where $V_{FHC\_ii\_rot}$ represent the rotated first harmonic cosine voltage coefficients. The first harmonic cosine coefficients may be similarly rotated by αm plus an additional 90 degree back rotation to obtain rotated first harmonic sine coefficients, for example, as follows:

$$V_{FHS\_ii\_rot} \stackrel{def}{=} R_{90} G_{Ti\_ratio} V_{FHS\_ii} G_{Ri\_ratio} R_{\alpha m}^t R_{90}^t = \begin{bmatrix} 0 & 0 & g_{Tix}g_{Riz}z_{iixz} \\ 0 & 0 & g_{Tix}g_{Riz}z_{iiyz} \\ g_{Tiz}g_{Rix}z_{iizx} & g_{Tiz}g_{Rix}z_{iizy} & 0 \end{bmatrix} \quad (23)$$

where $V_{FHS\_ii\_rot}$ represent the rotated first harmonic sine voltage coefficients. The second harmonic cosine coefficients may be rotated similarly to the first harmonic cosine coefficients to obtain rotated second harmonic cosine coefficients, for example, as follows:

$$V_{SHC\_ii\_rot} \stackrel{def}{=} G_{Ti\_ratio} V_{SHC\_ii} G_{Ri\_ratio} R_{\alpha m}^t = \begin{bmatrix} g_{Tix}g_{Rix}\frac{(z_{iixx}-z_{iiyy})}{2} & g_{Tix}g_{Rix}\frac{(z_{iixy}+z_{iiyx})}{2} & 0 \\ g_{Tix}g_{Rix}\frac{(z_{iixy}+z_{iiyx})}{2} & -g_{Tix}g_{Rix}\frac{(z_{iixx}-z_{iiyy})}{2} & 0 \\ 0 & 0 & 0 \end{bmatrix} \quad (24)$$

where $V_{SHC\_ii\_rot}$ represent the rotated second harmonic cosine voltage coefficients. The second harmonic cosine coefficients may be similarly rotated by αm plus an additional 45 degree back rotation to obtain rotated second harmonic sine coefficients, for example, as follows:

$$V_{SHS\_ii\_rot} \stackrel{def}{=} R_{45} G_{Ti\_ratio} V_{SHS\_ii} G_{Ri\_ratio} R_{\alpha m}^t R_{45}^t = \begin{bmatrix} g_{Tix}g_{Rix}\frac{(z_{iixx}-z_{iiyy})}{2} & g_{Tix}g_{Rix}\frac{(z_{iixy}+z_{iiyx})}{2} & 0 \\ g_{Tix}g_{Rix}\frac{(z_{iixy}+z_{iiyx})}{2} & -g_{Tix}g_{Rix}\frac{(z_{iixx}-z_{iiyy})}{2} & 0 \\ 0 & 0 & 0 \end{bmatrix} \quad (25)$$

where $V_{SHS\_ii\_rot}$ represent the rotated second harmonic sine voltage coefficients. In the deep measurements, T1-R2 and T2-R1, the rotation angle of the receiver is different than that of the transmitter (owing to the first and second subs having different rotation rates) and thus the rotated tensor couplings don't have the same form as Equation 10. The rotated tensor couplings for the deep measurements (i.e., shown in the parentheses in Equation 9 for $V_{12}$ and $V_{21}$) may be expressed mathematically in harmonic form, for example, as follows (where i≠j):

$$R_{\theta i}^t Z_{ij} R_{\theta j} = Z_{DC\_ij} + Z_{FHC1\_ij}\cos(\theta_i) + \quad (26)$$
$$Z_{FHS1\_ij}\sin(\theta_i) + Z_{FHC2\_ij}\cos(\theta_j) + Z_{FHS2\_ij}\sin(\theta_j) +$$
$$Z_{C1C2\_ij}\cos(\theta_i)\cos(\theta_j) + Z_{C1S2\_ij}\cos(\theta_i)\sin(\theta_j) +$$
$$Z_{S1C2\_ij}\sin(\theta_i)\cos(\theta_j) + Z_{S1S2\_ij}\sin(\theta_i)\sin(\theta_j)$$

where $Z_{DC\_ii}$ represents a DC (average) coupling coefficient, $Z_{FHC1\_ij}$ and $Z_{FHC2\_ij}$ represent first order harmonic cosine coefficients for $\theta_i$ and $\theta_j$, $Z_{FHS1\_ij}$ and $Z_{FHS2\_ij}$ represent first order harmonic sine coefficients for $\theta_i$ and $\theta_j$, and $Z_{C1C2\_ij}$, $Z_{C1S2\_ij}$, $Z_{S1C2\_ij}$, and $Z_{S1S2\_ij}$ represent second order cosine cosine, cosine sine, sine cosine, and sine coefficients of the couplings. These coefficients are shown below:

$$Z_{DC\_ij} = \begin{bmatrix} 0 & 0 & 0 \\ 0 & 0 & 0 \\ 0 & 0 & Z_{ijzz} \end{bmatrix} \quad (27)$$

$$Z_{FHC1\_ij} = \begin{bmatrix} 0 & 0 & Z_{ijxz} \\ 0 & 0 & Z_{ijyz} \\ 0 & 0 & 0 \end{bmatrix}, Z_{FHS1\_ij} = \begin{bmatrix} 0 & 0 & Z_{ijyz} \\ 0 & 0 & -Z_{ijxz} \\ 0 & 0 & 0 \end{bmatrix}$$

$$Z_{FHC2\_ij} = \begin{bmatrix} 0 & 0 & 0 \\ 0 & 0 & 0 \\ Z_{ijzx} & Z_{ijzy} & 0 \end{bmatrix}, Z_{FHS2\_ij} = \begin{bmatrix} 0 & 0 & 0 \\ 0 & 0 & 0 \\ Z_{ijzy} & -Z_{ijzx} & 0 \end{bmatrix}$$

$$Z_{C1C2\_ij} = \begin{bmatrix} Z_{ijxx} & Z_{ijxy} & 0 \\ Z_{ijyx} & Z_{ijyy} & 0 \\ 0 & 0 & 0 \end{bmatrix}, Z_{C1S2\_ij} = \begin{bmatrix} Z_{ijxy} & -Z_{ijxx} & 0 \\ Z_{ijyy} & -Z_{ijyx} & 0 \\ 0 & 0 & 0 \end{bmatrix}$$

$$Z_{S1C2\_ij} = \begin{bmatrix} Z_{ijyx} & Z_{ijyy} & 0 \\ -Z_{ijxx} & -Z_{ijxy} & 0 \\ 0 & 0 & 0 \end{bmatrix}, Z_{S1S2\_ij} = \begin{bmatrix} Z_{ijyy} & -Z_{ijyx} & 0 \\ -Z_{ijxy} & Z_{ijxx} & 0 \\ 0 & 0 & 0 \end{bmatrix}$$

The measured voltages $V_{12}$ and $V_{21}$ (in Equation 9) may be re-written using rotation matrices, for example, as follows:

$$V_{12} = G_{T1}(R_{\theta 1}^t Z_{12} R_{\theta 2\alpha}) G_{R2}$$

$$V_{21} = G_{T2}(R_{\theta 2}^t Z_{21} R_{\theta 1\alpha}) G_{R1} \quad (28)$$

where:

$$R_{\theta 1\alpha} = \begin{bmatrix} \cos(\alpha+\theta_1) & -\sin(\alpha+\theta_1) & 0 \\ \sin(\alpha+\theta_1) & \cos(\alpha+\theta_1) & 0 \\ 0 & 0 & 1 \end{bmatrix} \quad (29)$$

$$R_{\theta 2\alpha} = \begin{bmatrix} \cos(\alpha+\theta_2) & -\sin(\alpha+\theta_2) & 0 \\ \sin(\alpha+\theta_2) & \cos(\alpha+\theta_2) & 0 \\ 0 & 0 & 1 \end{bmatrix}$$

The measured voltages may then be expressed as follows:

$$V_{12} = V_{DC\_12} + V_{FHC1\_12}\cos(\theta_1) + V_{FHS1\_12}\sin(\theta_1) + \quad (30)$$
$$V_{FHC2\_12}\cos(\alpha+\theta_2) + V_{FHS2\_12}\sin(\alpha+\theta_2) +$$
$$V_{C1C2\_12}\cos(\theta_1)\cos(\alpha+\theta_2) + V_{C1S2\_12}\cos(\theta_1)\sin(\alpha+\theta_2) +$$
$$V_{S1C2\_12}\sin(\theta_1)\cos(\alpha+\theta_2) + V_{S1S2\_12}\sin(\theta_1)\sin(\alpha+\theta_2)$$

and $$V_{21} = V_{DC\_21} + V_{FHC1\_21}\cos(\alpha+\theta_1) + \quad (31)$$
$$V_{FHS1\_21}\sin(\alpha+\theta_1) + V_{FHC2\_21}\cos(\theta_2) + V_{FHS2\_21}\sin(\theta_2) +$$
$$V_{C1C2\_21}\cos(\alpha+\theta_1)\cos(\theta_2) + V_{C1S2\_21}\cos(\alpha+\theta_1)\sin(\theta_2) +$$
$$V_{S1C2\_21}\sin(\alpha+\theta_1)\cos(\theta_2) + V_{S1S2\_21}\sin(\alpha+\theta_1)\sin(\theta_2)$$

As described previously for the $V_{11}$ and $V_{22}$ voltage measurements, the y transmitter and receiver gains may be replaced by the x transmitter and receiver gains via multiplying the measured voltages by the gain ratio matrices. These voltages may then be expressed as follows (where i≠j):

$$V_{ij\_GM} \stackrel{def}{=} G_{Ti\_ratio} V_{ij} G_{Rj\_ratio} \qquad (32)$$

Assuming that the alignment angle α is known (e.g., measured), the voltages may then be fit to Equation 30 or 31 to obtain the following voltage harmonics (again where i≠j):

$$V_{DC\_ij} = \begin{bmatrix} 0 & 0 & 0 \\ 0 & 0 & 0 \\ 0 & 0 & g_{Tix}G_{Rjx}Z_{ijzz} \end{bmatrix} \qquad (33)$$

$$V_{FHC1\_ij} = \begin{bmatrix} 0 & 0 & g_{Tix}g_{Rjx}Z_{ijxz} \\ 0 & 0 & g_{Tix}g_{Rjz}Z_{ijyz} \\ 0 & 0 & 0 \end{bmatrix}$$

$$V_{FHS1\_ij} = \begin{bmatrix} 0 & 0 & g_{Tix}g_{Rjz}Z_{ijyz} \\ 0 & 0 & -g_{Tix}g_{Rjz}Z_{ijxz} \\ 0 & 0 & 0 \end{bmatrix}$$

$$V_{FHC2\_ij} = \begin{bmatrix} 0 & 0 & 0 \\ 0 & 0 & 0 \\ g_{Tiz}g_{Rjx}Z_{ijzx} & g_{Tiz}g_{Rjx}Z_{ijzx} & 0 \end{bmatrix}$$

$$V_{FHS2\_ij} = \begin{bmatrix} 0 & 0 & 0 \\ 0 & 0 & 0 \\ g_{Tiz}g_{Rjx}Z_{ijzy} & -g_{Tiz}g_{Rjx}Z_{ijzx} & 0 \end{bmatrix}$$

$$V_{C1C2\_ij} = \begin{bmatrix} g_{Tix}g_{Rjx}Z_{ijxx} & g_{Tix}g_{Rjx}Z_{ijxy} & 0 \\ g_{Tix}g_{Rjx}Z_{ijyx} & g_{Tix}g_{Rjx}Z_{ijyy} & 0 \\ 0 & 0 & 0 \end{bmatrix}$$

$$V_{C1S2\_ij} = \begin{bmatrix} g_{Tix}g_{Rjx}Z_{ijxy} & -g_{Tix}g_{Rjx}Z_{ijxx} & 0 \\ g_{Tix}g_{Rjx}Z_{ijyy} & -g_{Tix}g_{Rjx}Z_{ijyx} & 0 \\ 0 & 0 & 0 \end{bmatrix}$$

$$V_{S1C2\_ij} = \begin{bmatrix} g_{Tix}g_{Rjx}Z_{ijyx} & g_{Tix}g_{Rjx}Z_{ijyy} & 0 \\ -g_{Tix}g_{Rjx}Z_{ijxx} & -g_{Tix}g_{Rjx}Z_{ijxy} & 0 \\ 0 & 0 & 0 \end{bmatrix}$$

$$V_{S1S2\_ij} = \begin{bmatrix} g_{Tix}g_{Rjx}Z_{ijyy} & -g_{Tix}g_{Rjx}Z_{ijyx} & 0 \\ -g_{Tix}g_{Rjx}Z_{ijxy} & g_{Tix}g_{Rjx}Z_{ijxx} & 0 \\ 0 & 0 & 0 \end{bmatrix}$$

The rotated voltage measurements in Equations 21-26 and the deep rotated measurements in Equations 32 and 33 may be combined to form various ratios thereby obtaining a large number of compensated measurements (e.g., at 140 in FIG. 3A or at 142 and 144 in FIG. 3B). Selected ones of these compensated measurements are presented below (it will be understood that the selected measurements described below are intended to be representative rather than exhaustive of the disclosed embodiments and that the artisan of ordinary skill will be readily able to derive other compensated measurements based on the present disclosure). For example, a compensated zz coupling, CZZ, may be computed as follows:

$$CZZ = \sqrt{\frac{V_{DC\_12} \cdot V_{DC\_21}}{V_{DC\_11} \cdot V_{DC\_22}}} = \sqrt{\frac{Z_{12zz}Z_{21zz}}{Z_{11zz}Z_{22zz}}} \qquad (34)$$

where $V_{DC\_12}$ and $V_{DC\_21}$ are defined above with respect to Equation 33 and $V_{DC\_11}$ and $V_{DC\_22}$ are defined above with respect to Equations 21 and 26. It will be appreciated that CZZ may be obtained directly from the zz voltage measurements without having to fit the voltage measurements to multiple coefficients (as the zz measurements depend only on the the DC component). It will also be appreciated that the zz voltage measurements are independent of the relative angular positions of the first and second subs and thus CZZ may be obtained without measuring the rotation rate or angular position of either sub.

Gain compensated axial cross coupling components (xz, yz, zx, and zy) may be similarly obtained. Appropriate voltage measurements may optionally be combined to improve signal to noise ratio. For example, the following xz, yz, zx, and zy combinations may be computed using the $V_{11}$ and $V_{22}$ measurements in Equations 22, 23, and 26:

$$XZ_{ii} \stackrel{def}{=} \frac{V_{FHC\_iixz\_rot} + V_{FHS\_iixz\_rot}}{2} = g_{Tix}g_{Riz}Z_{iixz} \qquad (35)$$

$$YZ_{ii} \stackrel{def}{=} \frac{V_{FHC\_iiyz\_rot} + V_{FHS\_iiyz\_rot}}{2} = g_{Tix}g_{Riz}Z_{iiyz} \qquad (36)$$

$$ZX_{ii} \stackrel{def}{=} \frac{V_{FHC\_iizx\_rot} + V_{FHS\_iizx\_rot}}{2} = g_{Tiz}g_{Rix}Z_{iizx} \qquad (37)$$

$$ZY_{ii} \stackrel{def}{=} \frac{V_{FHC\_iizy\_rot} + V_{FHS\_iizy\_rot}}{2} = g_{Tiz}g_{Rix}Z_{iizy} \qquad (38)$$

where $XZ_{ii}$, $YZ_{ii}$, $ZX_{ii}$, and $ZY_{ii}$ represent the xz, yz, zx, and zy combinations. The following xz, yz, zx, and zy combinations may also be computed using the $V_{12}$ and $V_{21}$ measurements in Equation 33:

$$DXZ_{ij} \stackrel{def}{=} \frac{V_{FHC1\_ijxz} - V_{FHS1\_ijyz}}{2} = g_{Tix}g_{Rjz}Z_{ijxz} \qquad (39)$$

$$DYZ_{ij} \stackrel{def}{=} \frac{V_{FHC1\_ijyz} + V_{FHS1\_ijxz}}{2} = g_{Tix}g_{Rjz}Z_{ijyz} \qquad (40)$$

$$DZX_{ij} \stackrel{def}{=} \frac{V_{FHC2\_ijzx} - V_{FHS2\_ijzy}}{2} = g_{Tiz}g_{Rjx}Z_{ijzx} \qquad (41)$$

$$DZY_{ij} \stackrel{def}{=} \frac{V_{FHC2\_ijzy} + V_{FHS2\_ijzx}}{2} = g_{Tiz}g_{Rjx}Z_{ijzy} \qquad (42)$$

where i≠j and $DXZ_{ij}$, $DYZ_{ij}$, $DZX_{ij}$, and represent the xz, yz, zx, and zy combinations. Ratios of these combinations may be computed to obtain gain compensated xz, yz, zx, and zy quantities, for example as follows:

$$CXZ = \sqrt{\frac{DXZ_{12} \cdot DXZ_{21}}{XZ_{11} \cdot XZ_{22}}} = \sqrt{\frac{Z_{12xz}Z_{21xz}}{Z_{11xz}Z_{22xz}}} \qquad (43)$$

$$CYZ = \sqrt{\frac{DYZ_{12} \cdot DYZ_{21}}{YZ_{11} \cdot YZ_{22}}} = \sqrt{\frac{Z_{12yz}Z_{21yz}}{Z_{11yz}Z_{22yz}}} \qquad (44)$$

$$CZX = \sqrt{\frac{DZX_{12} \cdot DZX_{21}}{ZX_{11} \cdot ZX_{22}}} = \sqrt{\frac{Z_{12zx}Z_{21zx}}{Z_{11zx}Z_{22zx}}} \qquad (45)$$

$$CZX = \sqrt{\frac{DZY_{12} \cdot DZY_{21}}{ZY_{11} \cdot ZY_{22}}} = \sqrt{\frac{Z_{12zy}Z_{21zy}}{Z_{11zy}Z_{22zy}}} \qquad (46)$$

where CXZ, CYZ, CZX, and CZY represent the gain compensated xz, yz, zx, and zy quantities. It will be appreciated that these compensated quantities are computed from coefficients that are obtained via fitting the measured voltages to trigonometric functions of one or more of the measured toolface angles $\theta_1$ and $\theta_2$. For example, the CXZ and CYZ compensated quantities are computed from the $V_{12xz}$ and $V_{12yz}$ voltage measurements which are fit to $V_{FHC1\_12} \cos(\theta_1) + V_{FHS1\_12} \sin(\theta_1)$ to obtain the coefficients $V_{FHC1\_12}$ and $V_{FHS1\_12}$ and from the $V_{21xz}$ and $V_{21yz}$ voltage measurements which are fit to $V_{FHC1\_21} \cos(\alpha+\theta_1) + V_{FHS1\_21} \sin(\alpha+\theta_1)$ to obtain the coefficients $V_{FHC1\_21}$ and $V_{FHS1\_21}$ using the measured $\theta_1$ values while rotating. Likewise the CZX and CZY compensated quantities are computed from the $V_{12zx}$ and $V_{12zy}$ voltage measurements which are fit to $V_{FHC2\_12} \cos(\alpha+\theta_2) + V_{FHS2\_12} \sin(\alpha+\theta_2)$ to obtain the coefficients $V_{FHC2\_12}$ and $V_{FHS2\_12}$ and from the $V_{21xz}$ and $V_{21yz}$ voltage measurements which are fit to $V_{FHC2\_21} \cos(\theta_2) + V_{FHS2\_21} \sin(\theta_2)$ to obtain the coefficients $V_{FHC2\_21}$ and $V_{FHS2\_21}$ using the measured $\theta_2$ values while rotating.

Gain compensated cross-axial direct coupling (xx and yy) and cross-coupling components (xy and yx) may be similarly obtained. Appropriate voltage measurements may optionally be combined to improve signal to noise ratio. For example, the following xx, yy, xy, and yx combinations may be formed for the deep measurements ($V_{12}$ and $V_{21}$)

$$XX_{ij} \stackrel{def}{=} \frac{V_{C1C2\_ijxx} + V_{S1S2\_ijyy} - V_{C1S2\_ijxy} - V_{S1C2\_ijyx}}{4} = g_{Tix}g_{Rjx}Z_{ijxx} \quad (47)$$

$$YY_{ij} \stackrel{def}{=} \frac{V_{C1C2\_ijyy} + V_{S1S2\_ijxx} + V_{C1S2\_ijyx} + V_{S1C2\_ijxy}}{4} = g_{Tix}g_{Rjx}Z_{ijyy} \quad (48)$$

$$XY_{ij} \stackrel{def}{=} \frac{V_{C1C2\_ijxy} - V_{S1S2\_ijyx} + V_{C1S2\_ijxx} - V_{S1C2\_ijyy}}{4} = g_{Tix}g_{Rjx}Z_{ijxy} \quad (49)$$

$$YX_{ij} \stackrel{def}{=} \frac{V_{C1C2\_ijyx} - V_{S1S2\_ijxy} - V_{C1S2\_ijyy} + V_{S1C2\_ijxx}}{4} = g_{Tix}g_{Rjx}Z_{ijyx} \quad (50)$$

where $XX_{ij}$, $YY_{ij}$, $XY_{ij}$, and $YX_{ij}$ represent the xx, yy, xy, and yx combinations when $i \neq j$. Those of ordinary skill in the art would readily be able to form various other combinations using similar processing, for example, including combinations related to xx+yy, xx−yy, xy+yx, and xy−yx couplings. These combinations may also be formed by using combinations of individual voltage measurements that together have a simpler response as a function of the rotation angles (and therefore only require two fitting parameters).

$$V_{12xxyy} \stackrel{def}{=} V_{12xx} + V_{12yy} \quad (51)$$
$$= V_{xxplusyy\_12}\cos(\theta_1 - \alpha - \theta_2) + V_{xyminusyx\_12}\sin(\theta_1 - \alpha - \theta_2)$$

$$V_{12xyyx} \stackrel{def}{=} V_{12xy} + V_{12yx}$$
$$= V_{xyplusyx\_12}\cos(\theta_1 + \alpha + \theta_2) + V_{yyminusxx\_12}\sin(\theta_1 + \alpha + \theta_2)$$

and $$V_{21xxyy} \stackrel{def}{=} V_{21xx} + V_{21yy} \quad (52)$$
$$= V_{xxplusyy\_21}\cos(\theta_1 + \alpha - \theta_2) + V_{xyminusyx\_21}\sin(\theta_1 + \alpha - \theta_2)$$

$$V_{21xyyx} \stackrel{def}{=} V_{21xy} + V_{21yx}$$
$$= V_{xyplusyx\_21}\cos(\theta_1 + \alpha + \theta_2) + V_{yyminusxx\_21}\sin(\theta_1 + \alpha + \theta_2)$$

where the fitting coefficients $V_{xxplusyy\_ij}$, $V_{xyminusyx\_ij}$, $V_{xyplusyx\_ij}$, and $V_{yyminusxx\_ij}$ (where $i \neq j$) are given as follows:

$$V_{xxplusyy\_ij} = g_{Tix}g_{Rjx}(Z_{ijxx} + Z_{ijyy}) \quad (53)$$

$$V_{xyminusyx\_ij} = g_{Tix}g_{Rjx}(Z_{ijxy} - Z_{ijyx}) \quad (54)$$

$$V_{xyplusyx\_ij} = g_{Tix}g_{Rjx}(Z_{ijxy} + Z_{ijyx}) \quad (55)$$

$$V_{yyminusxx\_ij} = g_{Tix}g_{Rjx}(Z_{ijyy} - Z_{ijxx}) \quad (56)$$

From the above combinations in Equations 47-50 and 53-56 various gain compensated quantities may be computed. For example, ratios of any of the quantities in Equations 47-50 and 53-56 form gain compensated quantities. With respect to the three-dimensional tensor couplings, the xx, yy, xy, and yx couplings may be obtained for example, as follows:

$$CXX = \sqrt{\frac{XX_{12} \cdot XX_{21}}{(V_{DC\_11xx\_rot} + V_{SHC\_11xx\_rot})(V_{DC\_22xx\_rot} + V_{SHC\_22xx\_rot})}} = \sqrt{\frac{Z_{12xx}Z_{21xx}}{Z_{11xx}Z_{11xx}}} \quad (57)$$

$$CYY = \sqrt{\frac{YY_{12} \cdot YY_{21}}{(V_{DC\_11yy\_rot} + V_{SHC\_11yy\_rot})(V_{DC\_22yy\_rot} + V_{SHC\_22yy\_rot})}} = \sqrt{\frac{Z_{12yy}Z_{21yy}}{Z_{11yy}Z_{11yy}}} \quad (58)$$

$$CXY = \sqrt{\frac{XY_{12} \cdot XY_{21}}{(V_{DC\_11xy\_rot} - V_{DC\_11yx\_rot})(V_{DC\_22xy\_rot} - V_{DC\_22yx\_rot})}} = \sqrt{\frac{Z_{12xy}Z_{21xy}}{Z_{11xy}Z_{11xy}}} \quad (59)$$

$$CYX = \sqrt{\frac{YX_{12} \cdot YX_{21}}{(V_{DC\_11xy\_rot} + V_{DC\_11yx\_rot})(V_{DC\_22xy\_rot} + V_{DC\_22yx\_rot})}} = \sqrt{\frac{Z_{12yx}Z_{21yx}}{Z_{11yx}Z_{11yx}}} \quad (60)$$

where CXX, CYY, CXY, and CYX represent the compensated quantities. It will be appreciated that the CXX, CYY, CXY, and CYX compensated quantities are computed from voltage measurements that are fit to functions of both $\theta_1$ and $\theta_2$ (which may be measured while obtaining the electromagnetic logging measurements while rotating) to obtain the corresponding coefficients.

It may also be advantageous to compute normalized gain compensated cross-coupling quantities. For example, for the deep measurements $V_{12}$ and $V_{21}$ normalized quantities related to the xy and yx couplings may be computed by taking the ratio of Equations 49 and 50 to Equation 53 as follows:

$$CXYij = \frac{XY_{ij}}{V_{xxplusyy\_ij}} = \frac{Z_{ijxy}}{(Z_{ijxx} + Z_{ijyy})} \quad (61)$$

$$CXYij = \frac{YX_{ij}}{V_{xxplusyy\_ij}} = \frac{Z_{ijyx}}{(Z_{ijxx} + Z_{ijyy})} \quad (62)$$

where $CXYij$ and $CYXij$ (where $i \neq j$) represent the gain compensated quantities and $XY_{ij}$, $YX_{ij}$, and $V_{xxplusyy\_ij}$ are defined above in Equations 49, 50, and 53. Normalized gain compensated quantities related to the product of the xz and zx couplings and the product of the yz and zy couplings may also be computed, for example, as follows:

$$CXZZXij = \sqrt{\frac{DZX_{ij}}{V_{DC\_12}} \frac{DXZ_{ij}}{V_{xplusyy\_ij}}} = \sqrt{\frac{Z_{ijzx} \cdot Z_{ijxz}}{Z_{ijzz}(Z_{ijxx} + Z_{ijyy})}} \quad (63)$$

$$CYZZYij = \sqrt{\frac{DZY_{ij}}{V_{DC\_12}} \frac{DYZ_{ij}}{V_{xplusyy\_ij}}} = \sqrt{\frac{Z_{ijzy} \cdot Z_{ijyz}}{Z_{ijzz}(Z_{ijxx} + Z_{ijyy})}} \quad (64)$$

where CXZZXij and CYZZYij represent the gain compensated quantities (when i≠j) and $DXZ_{ij}$, $DZX_{ij}$, $DYZ_{ij}$, $DZY_{ij}$, $V_{DC\_12}$, and $V_{xpusyy\_ij}$ are defined above in Equations 33, 35-38, and 53.

The aforementioned combinations may also be used to compute compensated quantities that have properties similar to the symmetrized and anti-symmetrized quantities disclosed in U.S. Pat. Nos. 6,969,994 and 7,536,261 which are fully incorporated by reference herein. For example, the following compensated ratios may be computed.

$$R_{zx} \stackrel{def}{=} \frac{DZX_{12}}{V_{DC\_11}} \frac{DXZ_{21}}{V_{xplusyy\_22}} \quad (65)$$

$$R_{xz} \stackrel{def}{=} \frac{DXZ_{12}}{V_{xplusyy\_11}} \frac{DZX_{21}}{V_{DC\_22}}$$

$$R1_{xz\_zx} \stackrel{def}{=} \frac{DZX_{12}}{V_{DC\_12}} \frac{DXZ_{12}}{V_{xplusyy\_12}}$$

$$R2_{xz\_zx} \stackrel{def}{=} \frac{DZX_{21}}{V_{DC\_21}} \frac{DXZ_{21}}{V_{xplusyy\_21}}$$

In Equation 65, $R_{zx}$ and $R_{xz}$ represent compensated quantities that are proportional to the square of the zx and xz couplings. The quantities $R1_{xz\_zx}$ and $R2_{xz\_zx}$ represent compensated quantities that are proportional to the product of the zx and xz couplings. Gain compensated measurements sensitive to the zy and yz couplings and the product of the zy and yz couplings may be obtained similarly (i.e., by computing $R_{zy}$, $R_{yz}$, $R1_{yz\_zy}$, and $R2_{yz\_zy}$).

The compensated symmetrized and anti-symmetrized measurements may then be defined, for example, as follows:

$$Ac \stackrel{def}{=} 2\sqrt{R_{zx} + R_{xz} + \text{scale}(R1_{xz\_zx} + R2_{xz\_zx})} \quad (66)$$

$$Sc \stackrel{def}{=} 2\sqrt{R_{zx} + R_{xz} - \text{scale}(R1_{xz\_zx} + R2_{xz\_zx})}$$

where scale represents a scaling factor that gives a symmetrized result of zero in a homogeneous anisotropic formation. The scaling factor may be computed from the DC direct coupling impedances, for example, as follows:

$$\text{scale} = \sqrt{\frac{V_{DC\_12zz} V_{DC\_21zz} V_{DC\_12xx} V_{DC\_21xx}}{V_{DC\_11zz} V_{DC\_22zz} V_{DC\_11xx} V_{DC\_22xx}}}$$

As described above with respect to Equation 18, taking the square root of a quantity can introduce a sign (or phase) ambiguity. Even with careful unwrapping of the phase in Equation 66, a symmetrized directional measurement Sc may have the same sign whether an approaching bed is above or below the measurement tool. The correct sign may be selected, for example, via selecting the sign of the phase angle and/or attenuation of the following relation:

$$TSD = \sqrt{R_{zx}} - \sqrt{R_{xz}} \quad (67)$$

Similarly the anti-symmetrized directional measurement Ac in Equation 66 has the same sign whether the dip azimuth of the anisotropy is less than 180 degrees or greater than 180 degrees. This sign ambiguity may be resolved, for example, by taking the sign of the phase angle and/or attenuation of the following relation.

$$TAD = \sqrt{R_{zx}} + \sqrt{R_{xz}} \quad (68)$$

The symmetrized and anti-symmetrized measurements may now be re-defined, for example, as follows to eliminate the sign ambiguity.

$$Sc \stackrel{def}{=} 2\text{sign}(\text{angle}(TSD))\sqrt{R_{zx} + R_{xz} - \text{scale}(R1_{xz\_zx} + R2_{xz\_zx})} \quad (69)$$

$$Ac \stackrel{def}{=} 2\text{sign}(\text{angle}(TAD))\sqrt{R_{zx} + R_{xz} + \text{scale}(R1_{xz\_zx} + R2_{xz\_zx})}$$

A phase shift and attenuation may be computed for each of the compensated quantities listed above. Quantities related to the xx, yy, and zz couplings are generally never zero and thus the phase shift and attenuation may be computed, for example, as follows:

$$PS = \frac{180}{\pi} \text{angle}(CQ) \quad (70)$$

$$AT = 20 \log 10 (CQ)$$

where PS represents the phase shift, AT represents attenuation, and CQ represents the compensated quantity (e.g., one of the quantities computed in Equations 34, 57, and 58). Compensated quantities related to the cross terms (e.g., the xy, yx, xz, zx, yz, and zy couplings) may sometimes be equal to zero in simple formations (e.g., homogeneous formations not having boundary layers). For these quantities (e.g., those listed in Equations 43-46, 59-64, and 69), the phase shift and attenuation may be computed by adding one to CQ, for example, as follows:

$$PS = \frac{180}{\pi} \text{angle}(1 + CQ) \quad (71)$$

$$AT = 20 \log 10 (1 + CQ)$$

It will be understood that the various methods disclosed herein for obtaining fully gain compensated electromagnetic measurement quantities may be implemented on a on a downhole processor. By downhole processor it is meant an electronic processor (e.g., a microprocessor or digital controller) deployed in the drill string (e.g., in the electromagnetic logging tool or elsewhere in the BHA). In such embodiments, the fully compensated measurement quantities may be stored in downhole memory and/or transmitted to the surface while drilling via known telemetry techniques (e.g., mud pulse telemetry or wired drill pipe). Alternatively, the harmonic fitting coefficients may transmitted uphole and the compensated quantities may be computed at the surface using a surface processor. Whether transmitted to the surface or computed at the surface, the quantity may be utilized in an inversion process (along with a formation model) to obtain various formation parameters as described above.

It will also be understood that the methods disclosed herein may make use of a communication channel (such as a short hop telemetry channel) between the first and second subs, for example, for transmitting measured $\theta_1$ and/or $\theta_2$ values from one sub to another or from either or both of the subs to a downhole processor located elsewhere in the drill string.

Although compensated deep propagation measurements with differential rotation have been described in detail, it should be understood that various changes, substitutions and alternations can be made herein without departing from the spirit and scope of the disclosure as defined by the appended claims.

What is claimed is:

1. A bottom hole assembly comprising:
   a downhole drilling motor deployed axially between first and second electromagnetic logging while drilling subs, the motor configured to rotate the first sub with respect to the second sub;
   the first sub including a first transmitter and a first receiver axially spaced apart from one another;
   the second sub including a second transmitter and a second receiver axially spaced apart from one another;
   each of the first and second transmitters and first and second receivers including an axial antenna and collocated first and second transverse antennas; and
   the first and second transverse antennas in the first receiver being rotationally offset by a predefined angle from the first and second transverse antennas in the first transmitter and the first and second transverse antennas in the second receiver being rotationally offset by the predefined angle from the first and second transverse antennas in the second transmitter.

2. The bottom hole assembly of claim 1, wherein each of the first and second subs comprises:
   corresponding first and second sets of magnetometers; and
   downhole processors configured to (i) acquire magnetic field measurements from the first and second sets of magnetometers and (ii) process the magnetic field measurements to compute corresponding toolface angles and rotation rates of the first and second subs.

3. The bottom hole assembly of claim 1, wherein the first and second transverse antennas in each of the first and second transmitters and the first and second receivers comprise saddle coils.

4. The bottom hole assembly of claim 1, wherein the axial antenna and the first and second transverse antennas in each of the first and second transmitters and first and second receivers are collocated.

5. The bottom hole assembly of claim 1, wherein the predefined angle is about 45 degrees.

6. The bottom hole assembly of claim 1, further comprising a downhole processor configured to (i) acquire voltage measurements from the first and second receivers and (ii) process ratios of selected ones of the voltage measurements to obtain gain compensated measurement quantities.

7. The bottom hole assembly of claim 6, wherein (ii) comprises:
   (iia) processing the voltage measurements acquired in (i) to compute harmonic coefficients;
   (iib) processing selected ones of the harmonic coefficients computed in (iia) to obtain transmitter and receiver gain matrices;
   (iic) applying the gain matrices to the harmonic coefficients;
   (iid) mathematically rotating the harmonic coefficients through at least the predefined angle to obtain rotated coefficients;
   (iie) processing combinations of the rotated coefficients to obtain rotated combinations; and
   (iif) processing ratios of selected ones of the rotated combinations to obtain the gain compensated measurement quantities.

* * * * *